United States Patent Office 2,783,181
Patented Feb. 26, 1957

2,783,181

STABILIZED ANTIPERSPIRANT COSMETIC CREAM

Hyman Henkin, New York, N. Y., and Ralph Paul Messina, Hackensack, N. J., assignors to Colgate-Palmolive Company, Jersey City, N. J., a corporation of Delaware No Drawing. Application March 18, 1953,
Serial No. 343,246

2 Claims. (Cl. 167—90)

The present invention relates to cosmetic creams and has particular reference to emulsified antiperspirant cosmetic creams which have improved stability and resistance to phase separation even on long standing.

Numerous materials have been suggested heretofore for use as perspiration inhibitors. Such materials may be applied to the skin in a variety of different manners, one common method being to incorporate the same in an emulsified cosmetic cream. Experience has shown, however, that emulsified cosmetic creams having certain perspiration inhibitors incorporated therein sometimes are stable for only relatively short periods of time. Frequently such creams separate on standing. A portion of the aqueous phase may, for example, separate as layers either above and/or below the balance of the preparation.

Various attempts have been made heretofore to remedy this defect. A wide variety of different emulsifying agents, for example, have been suggested and tested with varying degrees of success. While certain of these materials have been found to be suitable for use in forming the emulsions their presence in the finished preparations has not improved to a satisfactory degree the stability and resistance to phase separation of the preparations on long standing.

It now has been discovered that antiperspirant cosmetic creams in the form of an emulsion comprising an oil phase and an aqueous phase, means for inhibiting the flow of perspiration, and means for dispersing said oil phase in said aqueous phase have their stability and resistance to phase separation improved to a satisfactory degree by combining therewith means for stabilizing the emulsion whereby the dispersion of said oil phase in said aqueous phase is maintained.

An example of a material suitable for use as the means for stabilizing the emulsified antiperspirant cosmetic creams of this invention comprises a polypropylene glycol of the 1,2 series having an average molecular weight of about 2025. This material may be prepared in accordance with known methods, one convenient method being to react 1,2 propylene oxide with propylene glycol in the presence of an alkaline catalyst.

The polypropylene glycol, in addition to serving as a stabilizer in the composition, i. e., in retarding or substantially minimizing phase separation of the emulsified creams, even on long standing, also serves to reduce the stickiness of the preparation.

The amount of polypropylene glycol used in formulation is variable and should be present in an amount sufficient to maintain the desired creaminess of the preparation and prevent separation of the oil phase and the aqueous phase. In general, the polypropylene glycol should be present in an amount within the range of about 1% to about 10% by weight of the final composition although larger amounts, e. g., on the order of about 15% or higher may be used.

The oil or fatty phase of the emulsified antiperspirant creams of this invention comprises one or more of the oily or fatty substances generally employed in formulating cosmetic creams. Examples of such materials which are suitable include natural and synthetic oils, fats, and waxes, e. g., spermaceti wax, paraffin, mineral oils, esters of fatty acids, lanolin, beeswax, petrolatum, ceresin wax and the like.

The aqueous phase of the cream comprises water and any other suitable water soluble ingredient which it is desired to incorporate in the finished composition. When aluminum sulfamate is used as the material for inhibiting the flow of perspiration it will be present in solution in the aqueous phase. In addition, the compositions may contain one or more fillers such as starch, talc, and kaolin. Perfume may be added if desired as well as suitable coloring agents.

The data set forth in the following table demonstrate the stability and improved resistance to phase separation of the novel emulsified antiperspirant cosmetic creams of the present invention. Five emulsified cream samples were made up as follows. Samples 1 and 2 contained:

| Ingredient: | Percent |
|---|---|
| Aqueous solution containing 40% aluminum sulfamate and 11.1% urea | 45.0 |
| Glyceryl monostearate | 13.0 |
| Spermaceti wax | 4.0 |
| Mineral oil | 0.7 |
| Propyl p-hydroxy benzoate | 0.1 |
| Soduim salt of sulfated monoglyceride of hydrogenated coconut oil fatty acids | 2.5 |
| Water | 31.25 |
| Glycerine | 2.5 |
| Titanium dioxide | 0.8 |
| Perfume | 0.15 |
| | 100.00 |

Samples 3–5 were similar to samples 1 and 2 with the exception that they contained 2.0, 2.5%, and 3.0%, respectively of polypropylene glycol (average molecular weight about 2025) and did not contain any glycerine. Equal quantities of the five samples were placed in covered clear glass jars and aged at 110° F. in an oven. The time at which the aqueous phase separated as bottom and top layers from the oil phase is noted in the table. These data demonstrate that the emulsified antiperspirant cosmetic creams of this invention containing polypropylene glycol (having an average molecular weight of about 2025) are upwards of about three times as stable against phase separation than otherwise similar emulsified antiperspirant cosmetic creams which do not contain the said polypropylene glycol.

TABLE

| Sample No. | Bottom separation apparent after aging for— | Top separation apparent after aging for— |
|---|---|---|
| 1 | 3 weeks and 3 days | 4 weeks. |
| 2 | do | 3 weeks and 3 days. |
| 3 | 8 weeks | No separation after aging for 11 weeks. |
| 4 | do | Do. |
| 5 | 9 weeks | Do. |

In order to indicate even more fully the nature of the present invention the following specific examples of emulsified antiperspirant cosmetic creams embodying the principles of this invention are set forth. The parts given are by weight unless otherwise indicated.

*Example I*

About 13 parts of glyceryl monostearate, about 4 parts of spermaceti wax, about 0.7 part mineral oil and about 0.1 part propyl p-hydroxy benzoate are admixed thoroughly and heated to about 185° F. To this mixture is added a warm solution of about 2.5 parts of the sodium salt of sulfated monoglyceride of coconut oil fatty acids dissolved in about 31.25 parts of water. The resulting mixture is heated to about 195°–200° F. whereupon about 2.5 parts of polypropylene glycol (having an average molecular weight of about 2025) and about 0.8 part of titanium dioxide are added. The resulting mass then is cooled to about 110° F. whereupon perfume and about 45 parts of an aqueous solution containing about 40% aluminum sulfamate and about 11.1% urea are added. The emulsified antiperspirant cream thus prepared then is cooled to about 100° F., milled in a colloid mill to the desired consistency and then filled into jars.

Other formulations illustrating the compositions of this invention include:

Example II

| | Parts |
|---|---|
| Diethylene glycol monostearate | 15.0 |
| Spermaceti wax | 5.0 |
| Polypropylene glycol (average molecular weight about 2025) | 1.0 |
| Sodium salt of sulfated monoglyceride of coconut oil fatty acids | 2.5 |
| Titanium dioxide | 0.5 |
| Aluminum sulfamate | 15.0 |
| Water | 54.0 |

Example III

| | Parts |
|---|---|
| Glyceryl monostearate | 12.0 |
| Spermaceti wax | 3.0 |
| Stearyl alcohol | 2.0 |
| Sodium β-oleylethane-amidsulfonate | 3.0 |
| Polypropylene glycol (average molecular weight about 2025) | 2.5 |
| Aluminum sulfamate | 22.5 |
| Water | 56.0 |

Example IV

| | Parts |
|---|---|
| Glyceryl palmitate | 15.0 |
| Palmityl palmitate | 3.0 |
| Aluminum sulfamate | 25.0 |
| Polypropylene glycol (average molecular weight about 2025) | 10.0 |
| Sodium salt of sulfated monoglyceride of hydrogenated coconut oil fatty acids | 2.5 |
| Titanium dioxide | 0.8 |
| Water | 53.0 |

While there has been disclosed and described what is at present considered to be the preferred embodiment of the invention it will be understood, of course, that many changes, modifications, and substitutions may be made therein without departing from the true scope of the invention as defined in the appended claims.

Thus, in addition to the specific polypropylene glycol herein described (which has an average molecular weight of about 2025) other materials, including those polypropylene glycols having either smaller or larger molecular weights, which function in a similar manner in stabilizing and improving the resistance to phase separation of the emulsified antiperspirant creams of this invention are equivalents to the particular polypropylene glycol here described and are included within the ambit of this invention as defined in the present claims.

Similarly, those perspiration inhibitors which are compatible in the emulsified creams of this invention are equivalents to the aluminum sulfamate perspiration inhibitor herein described and are included within the ambit of this invention as defined in the appended claims.

Having thus described the invention, what is claimed is:

1. An antiperspirant cosmetic cream comprising aluminum sulfamate, a sulfonated organic dispersing agent consisting of a sodium salt of a sulfated fatty acid monoglyceride, a wax consisting of an ester of a higher fatty acid and a higher fatty alcohol, a partial ester of a polyhydric alcohol and a higher fatty acid, and water in an emulsified form normally tending to separate on aging, and a polypropylene glycol having an average molecular weight of about 2025 in an amount effective to stabilize said emulsified cream against phase separation on aging.

2. The antiperspirant cosmetic cream of claim 1 wherein said polypropylene glycol constitutes from 2% to 3% by weight of said cream.

References Cited in the file of this patent

UNITED STATES PATENTS

| 2,309,722 | Wilkes | Feb. 2, 1943 |
| 2,586,287 | Apperson | Feb. 19, 1952 |

OTHER REFERENCES

Hackh's Chemical Dictionary, 3rd ed. (1944), p. 305.
Druce: Manufacturing Chemist, vol. 21, April 1950, pp. 159, 160 (167–91).